Jan. 7, 1964
F. C. WILLIAMS
3,117,267
INDUCTION MACHINES
Original Filed March 31, 1959
16 Sheets-Sheet 1
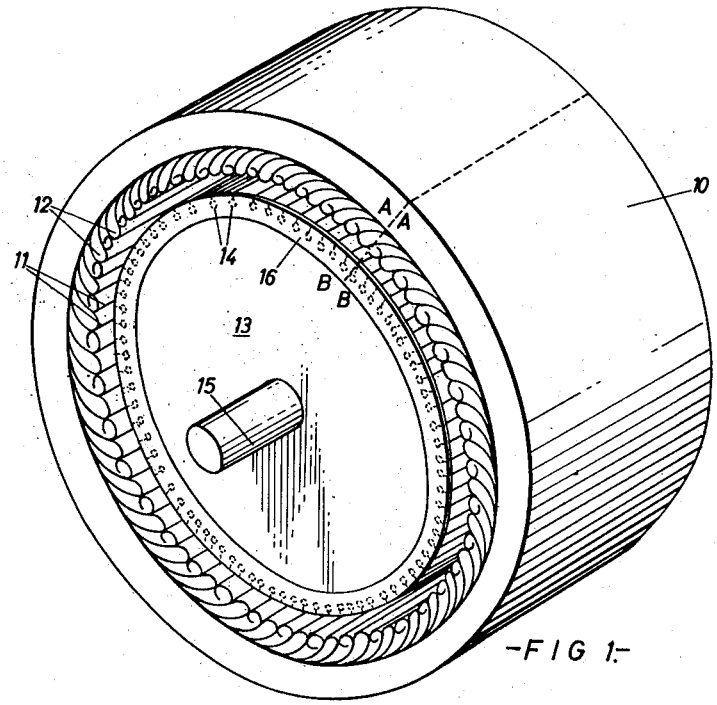
-FIG 1.-
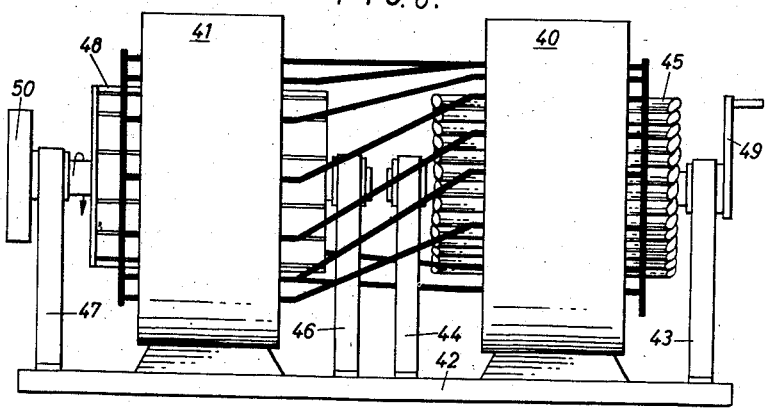
-FIG. 8.-
INVENTOR:
FREDERIC CALLAND WILLIAMS
By: Stevens, Davis, Miller & Mosher
Attorneys

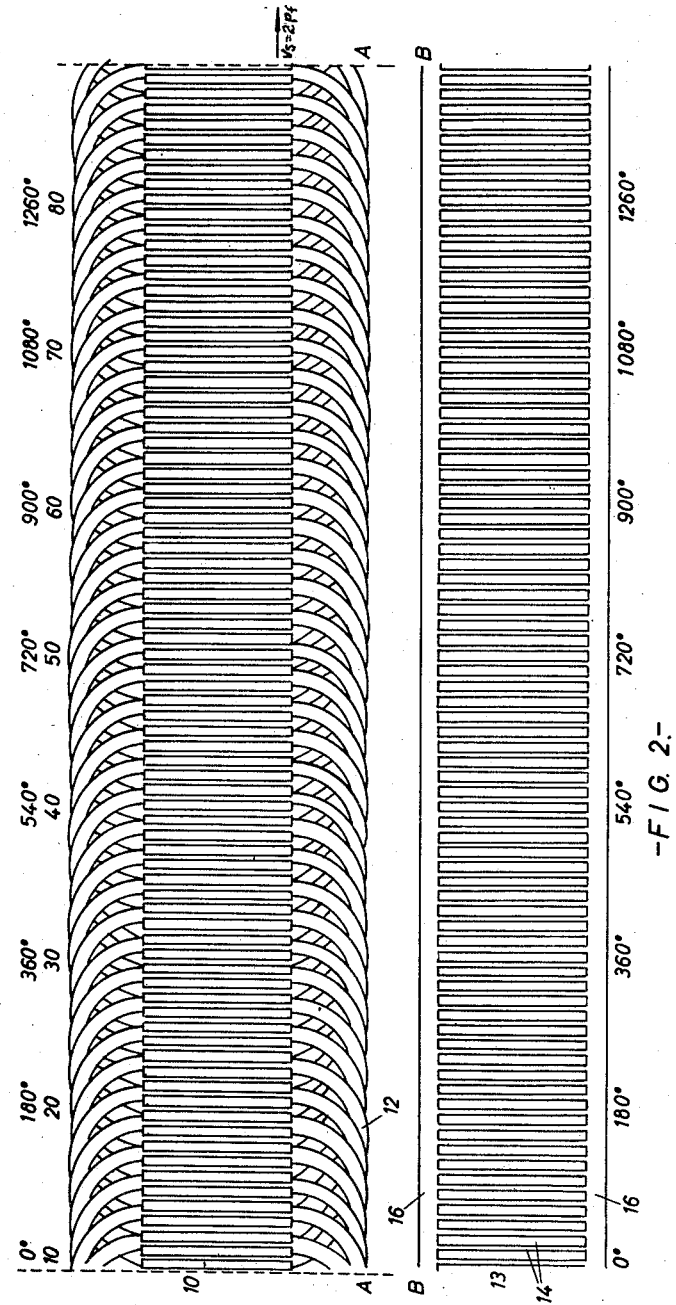
-FIG. 2.-

Jan. 7, 1964
F. C. WILLIAMS
3,117,267
INDUCTION MACHINES
Original Filed March 31, 1959
16 Sheets-Sheet 3
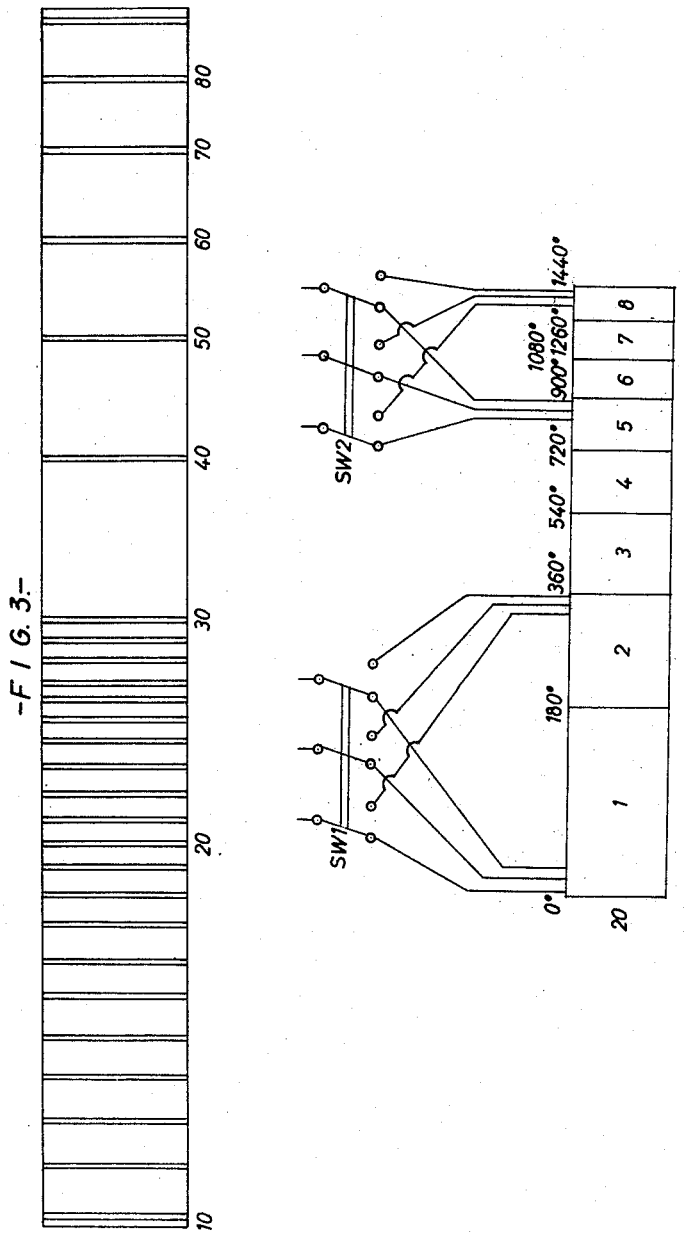
INVENTOR:
FREDERIC CALLAND WILLIAMS Jan. 7, 1964   F. C. WILLIAMS   3,117,267
INDUCTION MACHINES
Original Filed March 31, 1959   16 Sheets-Sheet 4
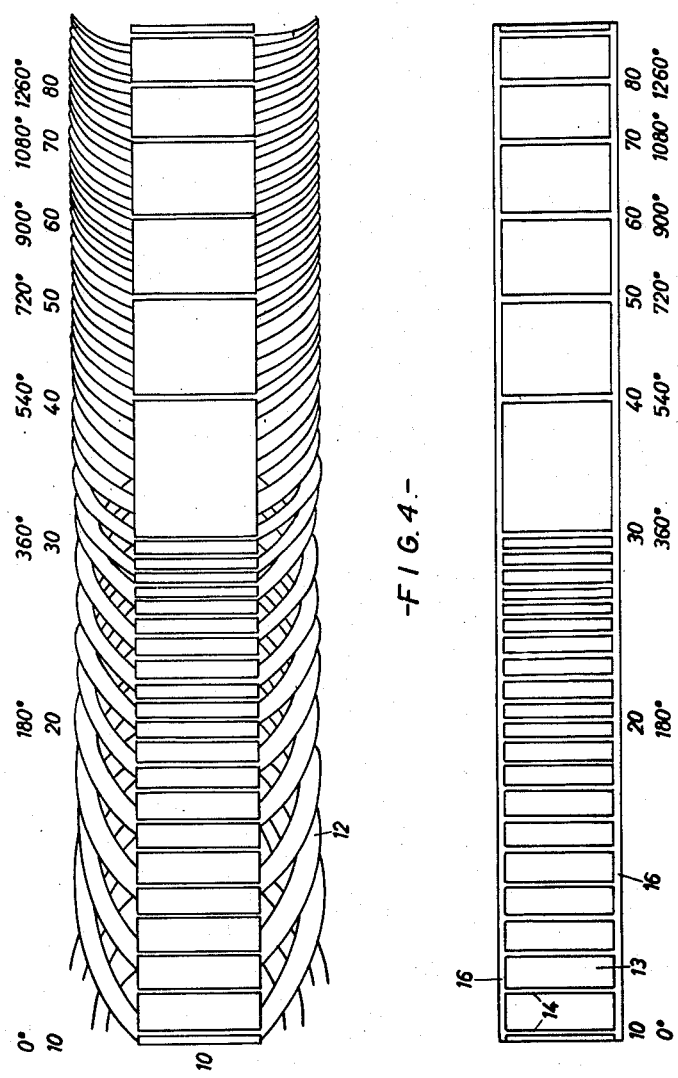
INVENTOR:
FREDERIC CALLAND WILLIAMS

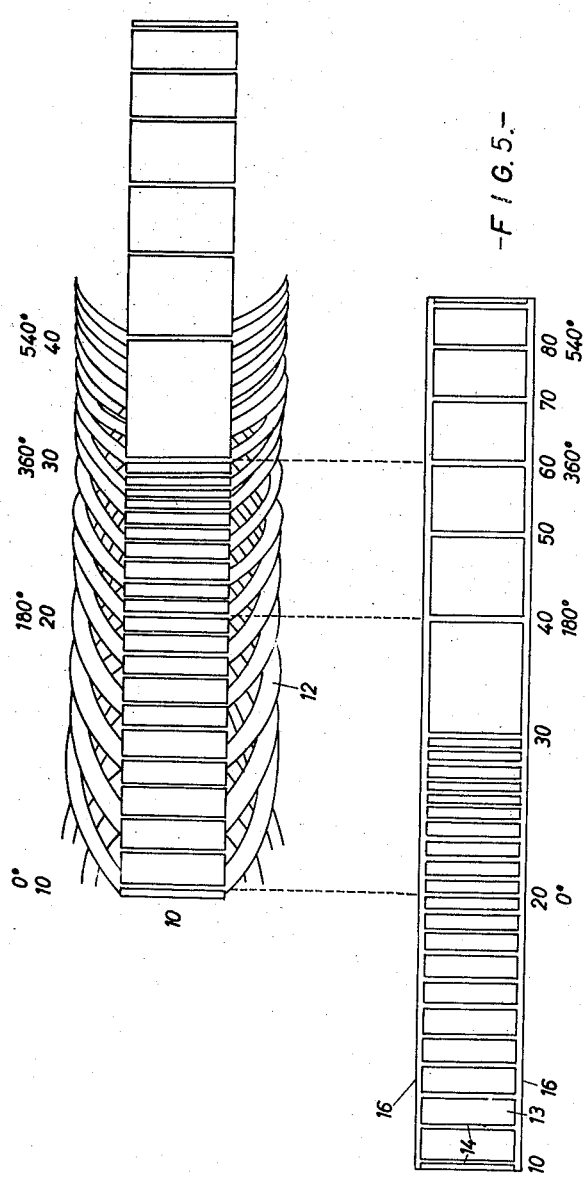

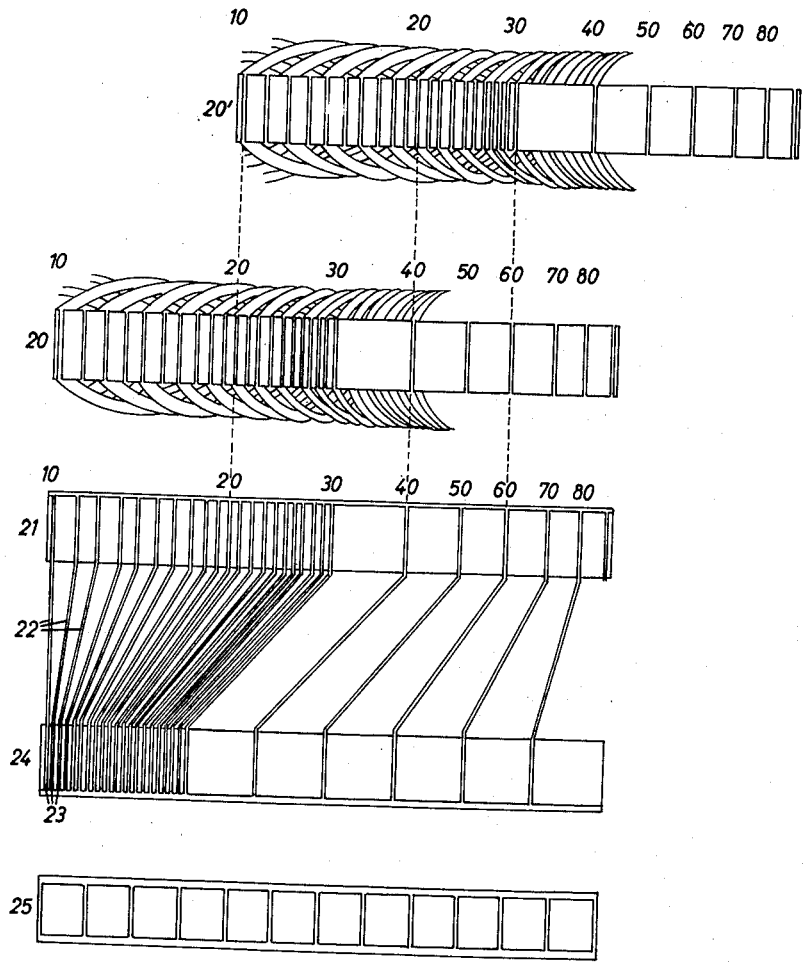
-FIG.6-

Jan. 7, 1964  F. C. WILLIAMS  3,117,267
INDUCTION MACHINES
Original Filed March 31, 1959  16 Sheets-Sheet 7
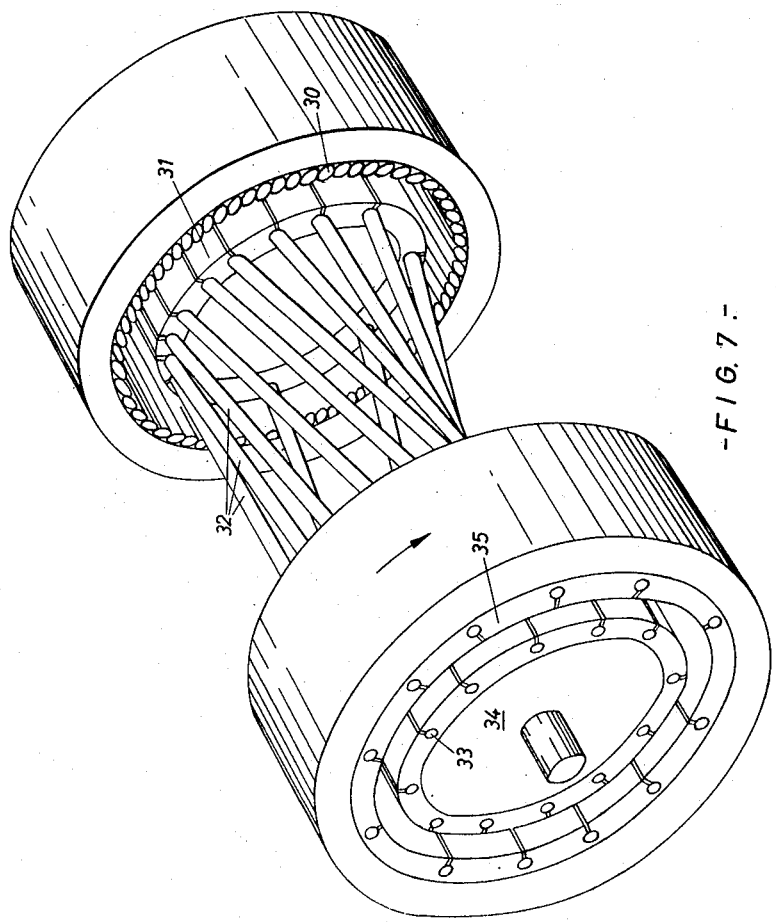
-FIG. 7.-
INVENTOR:
FREDERIC CALLAND WILLIAMS
By Stevens, Davis, Miller + Mosher
Attorneys Jan. 7, 1964     F. C. WILLIAMS     3,117,267
INDUCTION MACHINES
Original Filed March 31, 1959     16 Sheets-Sheet 8
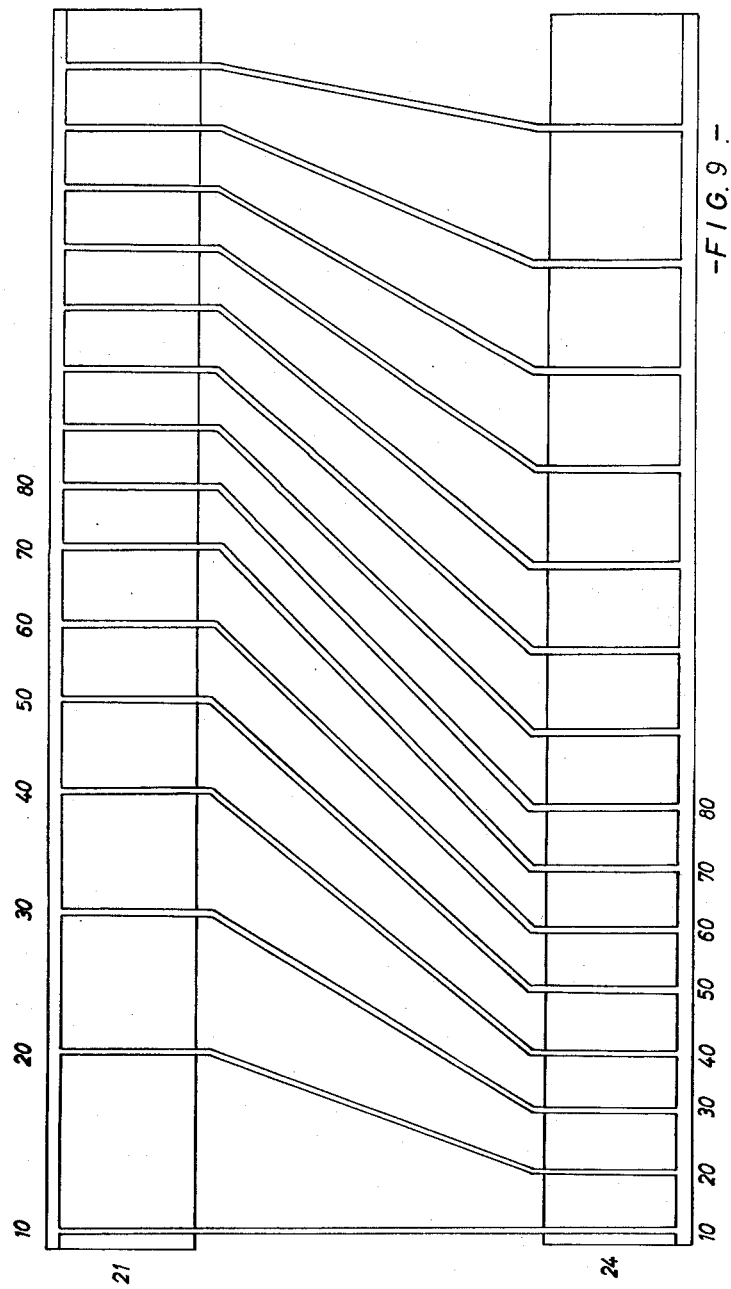
INVENTOR:
FREDERIC CALLAND WILLIAMS
By: Stevens, Davis, Miller & Mosher
Attorneys Jan. 7, 1964
F. C. WILLIAMS
3,117,267
INDUCTION MACHINES
Original Filed March 31, 1959
16 Sheets-Sheet 9
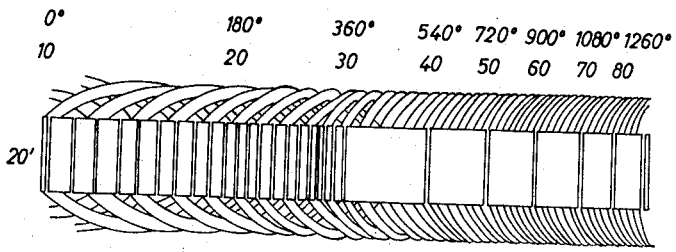
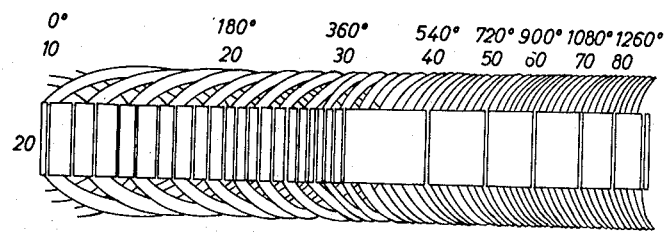
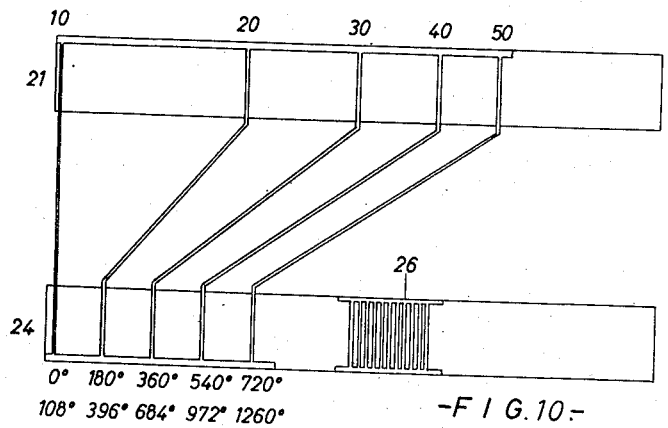
—FIG.10.—
INVENTOR:
FREDERIC CALLAND WILLIAMS Jan. 7, 1964 F. C. WILLIAMS 3,117,267
INDUCTION MACHINES
Original Filed March 31, 1959 16 Sheets-Sheet 10
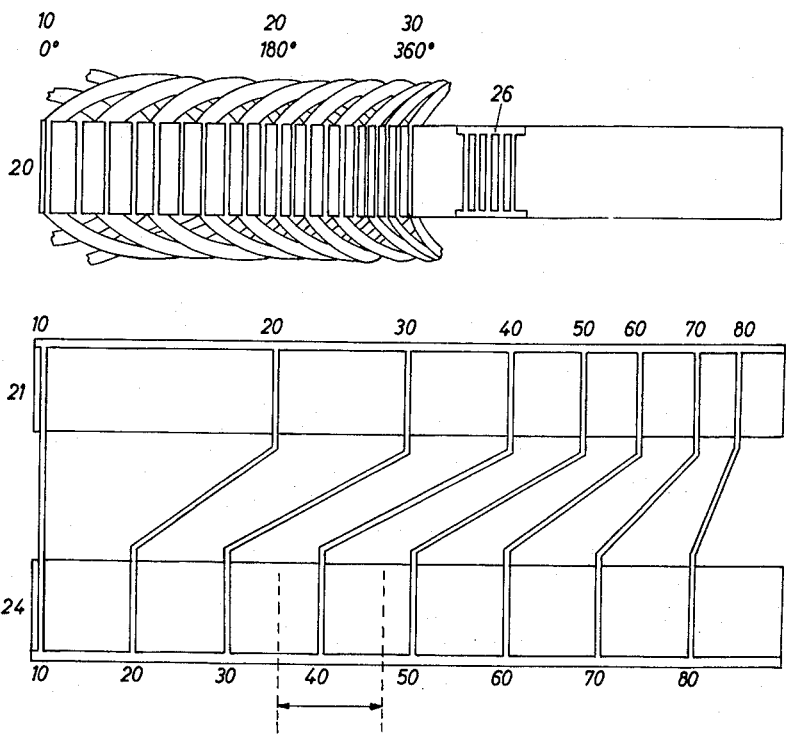
-FIG. 11.-
INVENTOR:
FREDERIC CALLAND WILLIAMS
BY
Stevens, Davis, Miller & Mosher
Attorneys Jan. 7, 1964 F. C. WILLIAMS 3,117,267
INDUCTION MACHINES
Original Filed March 31, 1959 16 Sheets-Sheet 11
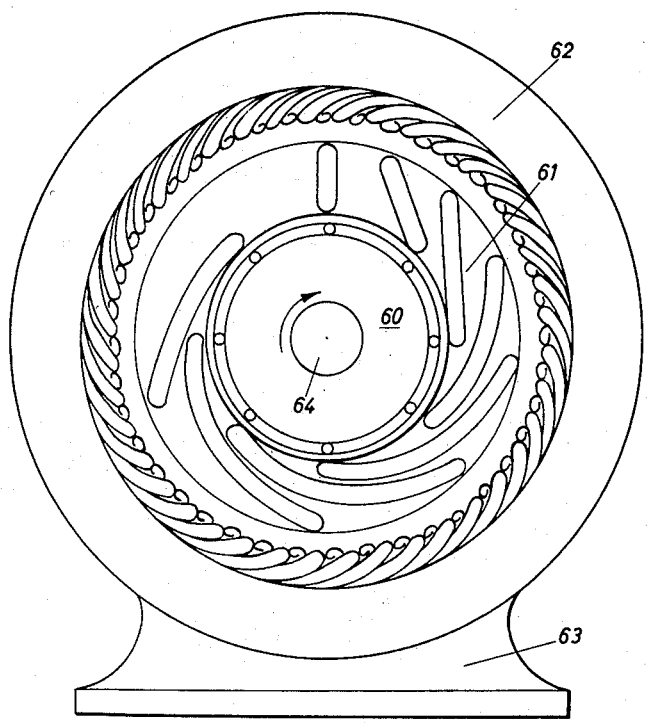
-FIG. 12.-
INVENTOR:
FREDERIC CALLAND WILLIAMS
BY
Stevens, Davis, Miller & Mosher
Attorneys Jan. 7, 1964 F. C. WILLIAMS 3,117,267
INDUCTION MACHINES
Original Filed March 31, 1959 16 Sheets-Sheet 12
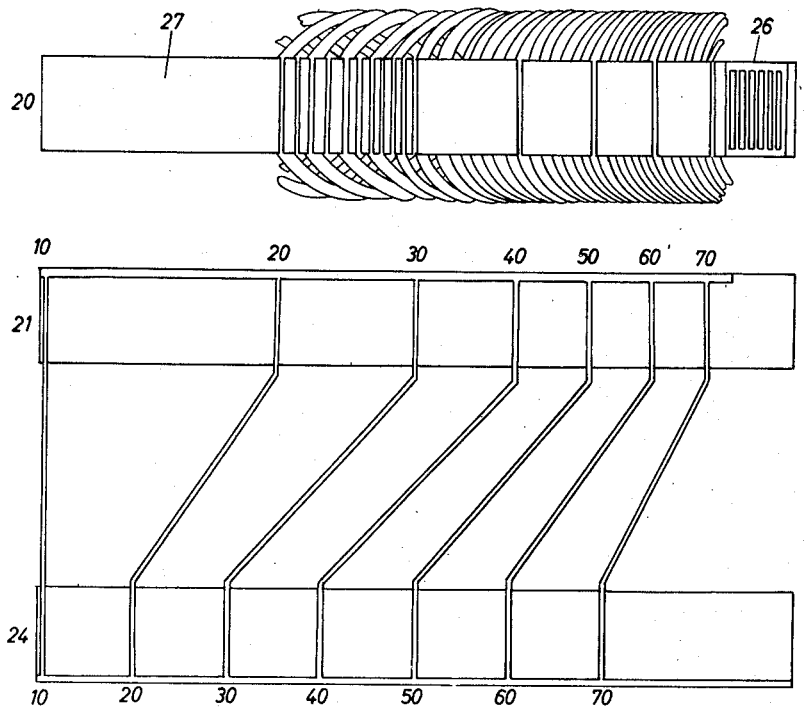
-FIG.13.-
INVENTOR:
FREDERIC CALLAND WILLIAMS
BY
Stevens, Davis, Miller & Mosher
Attorneys Jan. 7, 1964  F. C. WILLIAMS  3,117,267
INDUCTION MACHINES
Original Filed March 31, 1959  16 Sheets-Sheet 13
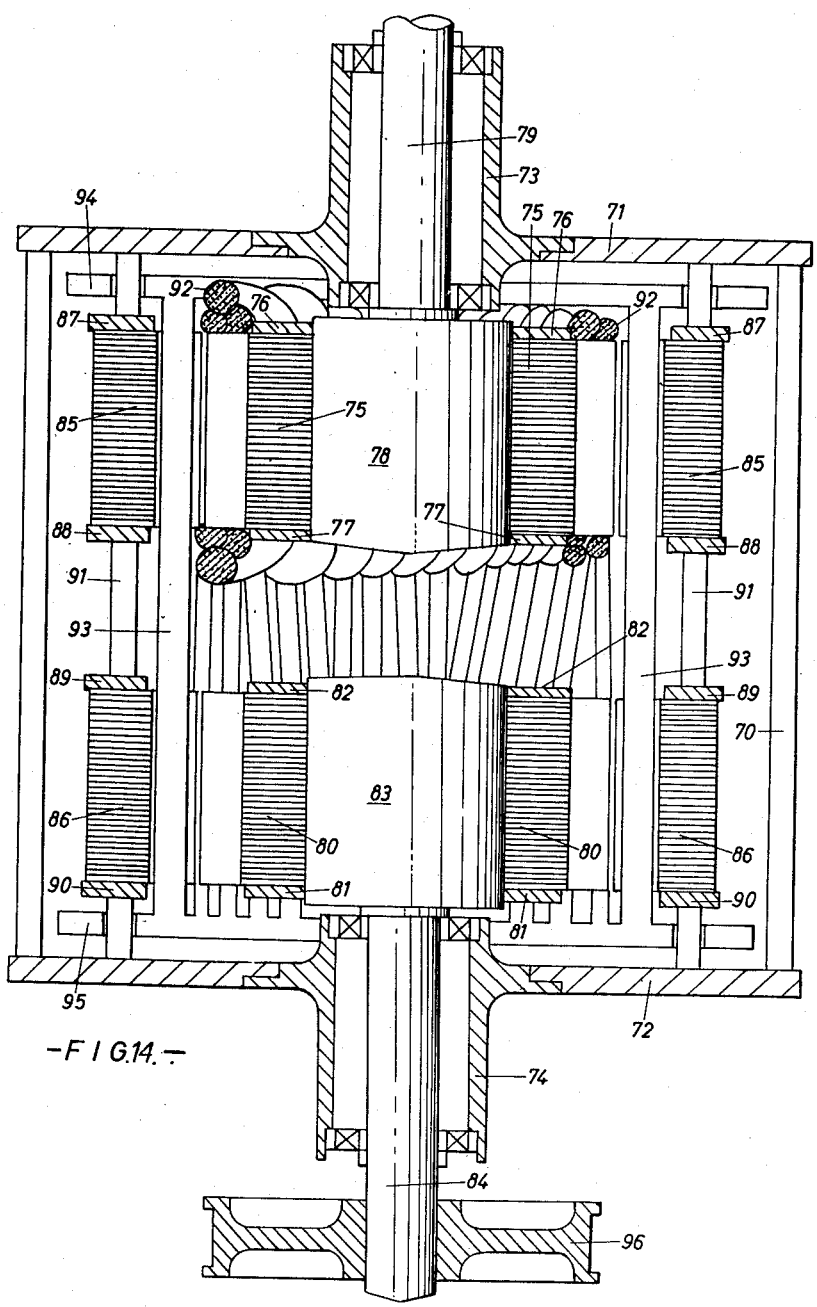
—FIG.14.—
INVENTOR:
FREDERIC CALLAND WILLIAMS
BY
Stevens, Davis, Miller & Mosher
Attorneys Jan. 7, 1964 F. C. WILLIAMS 3,117,267
INDUCTION MACHINES
Original Filed March 31, 1959 16 Sheets-Sheet 14

INVENTOR:
FREDERIC CALLAND WILLIAMS
BY
Stevens, Davis, Miller & Mosher
Attorneys

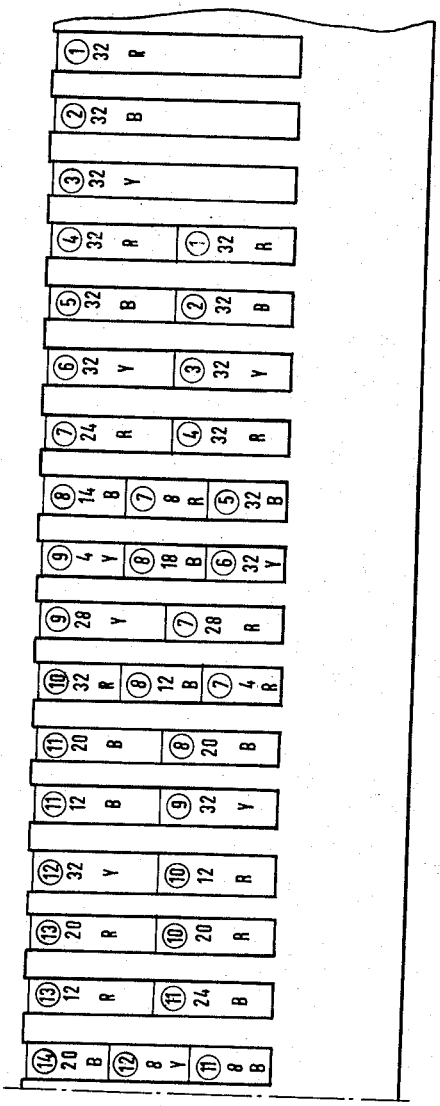
-FIG.15C-

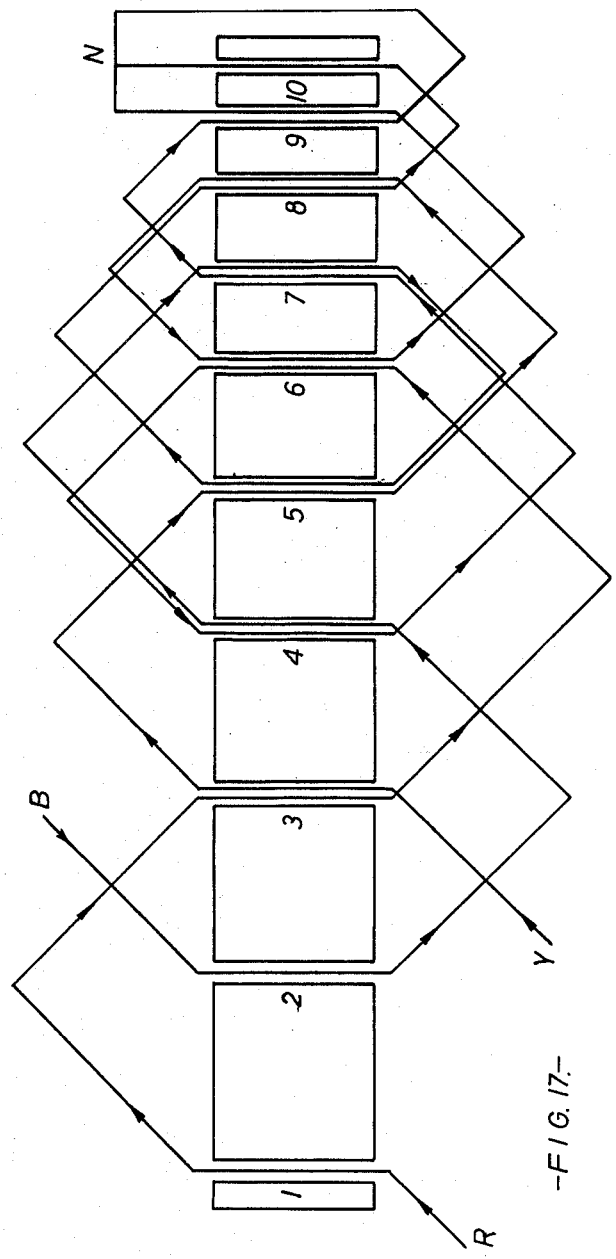
-FIG. 17.-

United States Patent Office 3,117,267
Patented Jan. 7, 1964

3,117,267
INDUCTION MACHINES
Frederic Calland Williams, Romily, England, assignor to National Research Development Corporation, London, England, a British corporation
Original application Mar. 31, 1959, Ser. No. 803,191, now Patent No. 3,046,471, dated July 24, 1962. Divided and this application Nov. 20, 1961, Ser. No. 153,463
Claims priority, application Great Britain Apr. 8, 1958
13 Claims. (Cl. 318—205)

This application is divided from copending application Serial No. 803,191 filed March 31, 1959, now Patent Number 3,046,471.

Copending application Serial No. 803,191 describes and claims a polyphase transformer having primary and secondary windings which are so arranged that the phase difference between adjacent pairs of output terminals of the secondary winding is adjustable in the same ratio by relative movement between the primary and secondary windings.

The object of the present invention is to employ this polyphase transformer to the provision of a variable speed induction machine.

According to the invention, the primary winding of the transformer is arranged in such a manner that the phase of the effective current flowing in the conductors of any slot is a logarithmic function of the distance of that slot from a first slot and the secondary winding is connected to a third winding forming the energising stator of the induction machine, the third winding being coupled to the rotor of the machine and the connection between said secondary winding and said third winding being such that the phase of the effective current which flows in the conductors of any slot of the third winding is proportional to the distance of said slot from a first slot, the constant of proportionality being adjusted by relative movement between the primary and secondary windings.

The invention will be better understood from the following description taken in conjunction with the accompanying drawings comprising FIGS. 1 to 17. In the drawings, FIG. 1 shows somewhat diagrammatically a squirrel cage induction motor of conventional type, FIG. 2 shows the stator and rotor windings when opened out, FIG. 3 shows the non-uniform arrangement of the slots in the transformer primary or secondary winding core, FIG. 4 shows the primary and secondary windings of the transformer arrangement, FIG. 5 illustrates the variable effect obtainable with the transformer arrangement, FIG. 6 shows the arrangement of the windings of an induction machine according to the invention, FIG. 7 shows diagrammatically one form of an induction machine according to the invention, FIG. 8 shows diagrammatically an alternative form of an induction machine according to the invention, FIG. 9 shows an alternative arrangement of the secondary winding of the transformer arrangement and the stationary structure of the induction machine, FIGS. 10 and 11 show further arrangements of the primary and secondary windings of the transformer arrangement and the stationary structure of the induction machine, FIG. 12 shows diagrammatically a further form of an induction machine according to the invention, FIG. 13 shows another arrangement of the primary and secondary windings of the transformer arrangement and the stationary structure of the induction machine, FIG. 14 shows a cross-sectional view of a constructional form of an induction machine according to the invention, FIGS. 15a, b, and c show a practical winding plan for the primary winding of the transformer arrangement, FIG. 16 shows a switching arrangement for rendering effective different sections of the transformer primary winding and FIG. 17 shows the manner in which the three phases of the supply are connected to the coils forming the primary winding of the transformer arrangement.

It should be explained that the same parts are shown in many of the drawings and where this occurs, the parts are given the same reference in the different drawings.

The invention will be best understood by considering the principles of operation of a squirrel cage induction motor of the type shown in FIG. 1. In this drawing, the stator 10 of the machine is provided with a plurality of slots 11 for the reception of coils 12. The rotor 13 is also provided with slots each of which houses a single bar 14 of conducting material. The bars are joined together at the two ends by the provision of end rings also of conducting material, one of the end rings being shown at 16. The rotor is of course mounted for rotation on a shaft 15. As is well known the stator winding when energised from a polyphase source of supply gives rise to a rotating magnetic field which causes current to flow in the rotor bars thereby giving rise to a second magnetic field which interacts with the first field to cause the rotation of the rotor.

If the motor shown in FIG. 1 is cut along the dotted line and opened out flat and if, in addition, the rotor and stator are opened bookwise, the appearance of the two parts will be as shown in FIG. 2 respectively where the letters A and B correspond to the same letters shown in FIG. 1. In this developed form, the stator winding produces a magnetic field travelling with velocity $v_s$ equal to $2pf$, where $p$ is the pole pitch of the winding and $f$ the frequency of the supply. In the ideal case the energisation of the stator winding will produce alternating currents in the conductors in the slots, the phase of the currents advancing progressively from left to right. The phase difference between currents in any pair of adjacent slots is the same and equal to $$\frac{180n}{N}$$

degrees, where $n$ is number of poles and N is the number of slots. This is indicated in FIG. 2 for the case of an 8 pole structure having 80 slots, the phases being indicated for every tenth slot, relative to the phase at the left hand edge. The slots are numbered from 10 to 89, and it will be seen that the advance in phase from one slot to the next will be 18 degrees. That is to say if the phase of the currents flowing in the conductors of the first slot i.e. that numbered 10, is 0 degrees, the phase of the currents in the second slot will be 18 degrees, that in the third will be 36 degrees, that in the fourth will be 54 degrees and so on. The phase of the current flowing in the conductors of a slot is thus directly proportional to the distance of that slot from the first slot. The rotor squirrel cage is tightly coupled to this winding and its bars will carry a current directed in opposition to the element of stator current that they face. With the rotor stationary only very small differences between stator and rotor currents will be required to produce the magnetic field and these differences can be neglected in the first instance. Thus the phases of the rotor bar currents will be very nearly a copy of the stator phases as indicated.

It will be understood that the stator and the rotor may be regarded as the primary and secondary respectively of a transforming arrangement and that if one of the end rings of the rotor is removed and external connections are made to the rotor bars, current will flow in the external circuits when the stator winding is energised, the stator and rotor being maintained at rest. In view of this the terms stator and rotor will not be used in the subsequent description but the terms transformer primary and transformer secondary respectively will be adopted instead.

The above discussion has been concerned with the case where the slots in the transformer primary and the bars in or the ring wound coils on the transformer secondary uniformly spaced.

It will now be assumed that the slots in the primary and secondary windings are arranged, as shown in FIG. 3 in a non-linear manner such that the displacement of a slot from the left-hand edge of the winding is proportional to log $x/10$ where $x$ is the slot number counted from the left-hand edge of the winding. The displacement between the slots now decreases in passing from the left-hand edge towards the right-hand edge and the displacements are in fact in accordance with the markings on the bottom scale of a slide rule.

The total number of slots in the primary and secondary windings is again taken to be 80, numbered from 10 to 89 as in FIG. 2. The primary winding is wound in exactly the same manner as that shown in FIG. 2 and the secondary winding again consists of a set of bars, one for each slot as shown in FIG. 2. If the primary and secondary windings are arranged so that correspondingly numbered slots are in alignment, the result will be as shown in FIG. 4. If now the two structures carrying the primary and secondary windings are coupled together by "closing the book," individual bars of the secondary winding will face the same currents in the slots of the primary winding as they did in FIG. 2. The phase of the currents carried by the bars is therefore the same as it was in FIG. 2, that is assuming the phase of the current in the first bar to be zero, the phase of the currents in the second bar is 18 degrees, in the third bar 36 degrees, in the fourth bar 54 degrees and so on, the phase increment being 18 degrees.

Now suppose the relative positions of the transformer primary and secondary is changed to that shown in FIG. 5. Slots 10 to 20 of the transformer primary, which cover a phase interval of 180 degrees are now opposite slots 20 to 40 of the transformer secondary and slots 20 to 30 of the transformer primary which also cover a phase-interval of 180 degrees are opposite slots 40 to 60 of the transformer secondary and so on. Thus while slot No. 10 of the transformer primary is opposite to slot No. 20 of the transformer secondary, slot No. 11 of the transformer primary is opposite to slot No. 22 of the transformer secondary. Similarly slot No. 12 of the transformer primary is opposite to slot No. 24 of the transformer secondary and so on. Now the phase increment between the currents in adjacent slots of the transformer primary is still 18 degrees and hence the phase increment between the currents in the bars 20 and 22 and between bars 22 and 24 of the transformer secondary is also 18 degrees. As far as bars 21 and 23 are concerned, these are approximately mid-way between bars 20 and 22 and between bars 22 and 24 respectively so that the phase increment between the currents in bars 20 and 21, between the currents in bars 21 and 22, between the currents in bars 22 and 23 and between the currents in bars 23 and 24 is to a close approximation 9 degrees. Thus the phase increment between adjacent bars of the transformer secondary has been changed from 18 degrees to 9 degrees by altering the relative position of the transformer primary with respect to the transformer secondary from that shown in FIG. 4 to that shown in FIG. 5. It will be understood that if the transformer primary is moved further to the right from the position shown in FIG. 5, the phase displacement between adjacent bars of the transformer secondary will be still further reduced, while if it is moved to the left, the phase displacement will show a corresponding increase. Regarding each of the bars of the transformer secondary as an output, it will be seen that the arrangement provides a plurality of outputs in which the phase difference between the currents in the outputs is a function of the relative position of the primary and secondary windings. The arrangement is in fact a new type of transformer. The primary winding takes in a supply with a fixed number of phases (probably three), having a fixed relative phase displacement (probably 180 degrees) and the secondary yields a plurality of outputs of which the phase displacement between adjacent outputs is adjustable.

It was previously mentioned that the primary winding is the same as that shown in FIG. 2 and FIG. 17 shows diagrammatically the form of the winding. For simplicity only 10 slots have been shown and the simplest form of winding is illustrated, namely one having one slot per pole per phase. In addition the coils have been shown as comprising a single conductor but it will be understood that in general more than one conductor will be employed. The leads labelled R, B and Y are connected to the corresponding phases of the supply and N is the neutral point.

It will be understood that either a part of the structure accommodating the primary winding or a part of the structure accommodating the secondary winding must be unwound in order, in the case of a cylindrical machine, to prevent one end of the secondary winding being influenced by coils of the primary winding of unsuitable pole pitch on relative movement between the primary and secondary windings.

It will also be understood that in FIG. 4 it has not been possible to show all the slots in either of the structure, the first 20 slots being shown in full and thereafter every 10th lot. The position of the 0, 180°, 360° . . . points are however shown with the corresponding slot number as in FIG. 2.

An important application of the invention is to the provision of a variable speed induction motor and this application is illustrated in FIG. 6 of the drawings. Referring to FIG. 6, this shows the transformer primary 20 and transformer secondary 21 and connections 22 serve to connect the polyphase outputs from the secondary 21 to uniformly distributed bars 23 in a third slotted structure 24. This third structure has 80 uniformly separated slot numbered 10 to 89 and the bars in this structure are connected to the similarly numbered bars in the secondary. The bars in the third structure will therefore be supplied with currents whose phase increases progressively from left to right but in which the phase increment per bar is a function of the position of the transformer primary relative to the transformer secondary and changes as the transformer primary is moved to the positon indicated by 20'. Some of the bars, of course, will not be energised due to the shortening of the primary. However, over the energised part of the third structure, a travelling field will be generated on the surface of the third block whose velocity is a function of the position of the transformer primary relative to the transformer secondary. If now a fourth structure 25 is added containing a squirrel cage winding and electrically coupled to the third structure 24, but free to move, this fourth structure will tend to travel at a speed equal to the speed of the field generated by the third structure.

It will be understood that FIG. 6 is derived from the developed diagrams of cylindrical structures and it follows that the original stator and rotor block now forming the transformer primary and secondary respectively can be closed together like a book and rolled up again. Similarly the third and fourth structures can be closed together like a second book, and rolled up to provide a second cylindrical structure interconnected with the first by the bars 22 which are common to the transformer secondary and the third structure. The assembly will then appear as in FIG. 7. Referring to this drawing, the transformer primary is shown at 30 and the transformer secondary at 31. The slots in the primary and secondary windings are logarithmically spaced and the bars which form the secondary winding are interconnected by bars 32 to the equally spaced bars provided in slots 33 on the motor stator 34. The rotor 35 of the machine surrounds the stator and will rotate at a speed depending on the setting of the transformer primary relative to the transformer secondary. It will be understood that either the primary or the secondary of the transformer arrangement may be adjustable and the machine will be unconventional in that the rotating portion of the motor section is the outer portion. From the constructional point of view, the rotor 35 of the motor section could be secured to a circular plate of non-magnetic material having a central hollow shaft which would be supported in an overhung bearing, the shaft 36 of the stator extending through the hollow shaft. A similar arrangement could also be employed for the transformer section.

In an alternative arrangement shown in FIG. 8, the transformer primary could form the inner member of the transformer arrangement while the secondary could form the annular portion. The motor stator would then be the outer member of the motor section, giving a more practical form to the machine. Thus referring to FIG. 8, the transformer secondary 40 and the motor stator 41 are both mounted on a base plate 42. Also mounted on the base plate are bearings 43, 44 for the transformer primary 45 and bearings 46, 47 for the motor rotor 48. The operating handle 49 serves to adjust the position of the primary winding of the transformer relative to the secondary winding and the drive from the machine may be taken from the pulley 50.

A cross-sectional view through the slots of a machine constructed in a similar manner to that shown in FIG. 8 is shown in FIG. 14. The machine comprises a cylindrical housing 70 provided with end plates 71 and 72 each of which is provided with a centrally-disposed overhung bearing 73 and 74. The transformer primary consists of a number of sheet iron stampings 75 clamped by means of end plates 76, 77 on to a hub 78 provided on a shaft 79 carried by the overhung bearings 73. The motor rotor similarly consists of a number of stampings 80 clamped by means of end plates 81, 82 on to a hub 83 provided on a shaft 84 carried by the overhung bearing 74. The core structure of the transformer secondary and the motor stator also consist of stampings 85 and 86 respectively which are clamped between end plates 87, 88 and 89, 90 mounted on non-magnetic rods extending between the end plates 71 and 72, only two of the rods 91 being visible. The primary winding 92 of the transformer arrangement is indicated and the bars 93 forming the secondary winding, stator winding and interconnections therebetween are shown together with the short-circuiting rings 94 and 95. The drive is taken from the pulley 96.

It will, of course, be understood that the sections need not be rolled up to form cylindrical structures. If the books are closed then a linear transformer and a linear motor result. Alternatively the sections can be rolled up to form arcs of circles and combined with other similar sections to complete the circles. In particular, two such sections each occupying a semi-circle would provide a symmetrical assembly in which magnetic effects, such as the pull exercised between rotor and stator could be balanced. Such assemblies can also provide flux balance when fractional pole numbers are used, a fractional N pole on one section, for example, being matched by an equal fractional S pole on the other.

It will be understood that the invention has so far been described in terms of non-linear slotting of the primary and secondary forming the transformer section. Non-linear slotting is, however, not necessary provided there is an adequate number of slots. All that is required is that the distribution of the transformer windings should be in accordance with an approximately logarithmic pattern. Such a distribution may be obtained with uniformly displaced slots by using a winding plan which allocates a decreasing number of slots per pole as the winding proceeds from left to right.

An alternative and preferred winding plan, however, is shown in FIG. 15 and in this case the logarithmic distribution is obtained by mixing the phases of supply in the slots. The example shown in FIG. 15 is for an 8-pole primary winding having 54 equally spaced slots and gives a good approximation to the correct effective current in each slot while maintaining the same total number of turns for each coil. A total of 22 coils are provided and the circled references in the slots represent the coil numbers while the plain references indicate the number of conductors of the corresponding coil appearing in the slot. Thus the first coil has 32 turns and is energised from the R phase of the supply. This coil is located in the first and fourth slots beginning at the right hand side of the drawing. The 17th coil also has 32 turns and is energised from the B phase but the coil is divided between slots 22, 23 and 24 with 4, 18 and 10 turns respectively and between slots 28, 29 and 30 with 6, 10 and 16 turns respectively.

As regards the secondary winding using uniform slotting, each bar or ring-wound coil is not individually connected to a bar on the motor stator but some of the bars or coils are connected in series or omitted in order to provide the desired phase output pattern.

Further in the arrangement so far described the non-linear displacement of the windings are confined to the transformer section. However from a constructional point of view, this is not very convenient owing to the fact that the spacing of the slots becomes too small to be practical for winding purposes. Accordingly the non-linearity is divided between the secondary of the transformer and the stator section of the motor as shown in FIG. 9. Referring to this drawing, the slots 10 to 70 of the transformer secondary 21 are logarithmically spaced while the slots from 70 onwards are evenly spaced. As regards the stator, slots 10 to 70 are equally spaced while the slots from 70 onwards are logarithmically spaced. Thus the logarithmic spacing of the slots is in opposite senses in the secondary and the stator. The non-linearity of the transformer primary will not then correspond with that of the secondary alone but with the combined non-linearity of the transformer secondary and the motor stator. With the arrangement described in which the transformer primary is shortened to allow for movement over the secondary surface, the resulting motor is energised over only a part of its periphery and the number of poles in this part is equal to the number of poles wound on the transformer primary. As the transformer primary is moved up and down the secondary, the number of poles on the motor stator remains constant but the arc which they occupy varies.

A further alternative arrangement, according to the invention is shown in developed form in FIG. 10, in which the transformer secondary has been shortened leaving the primary of full length. The bars in the transformer secondary may be connected to the motor stator either so as to fill the whole periphery or only a fixed arc of that periphery. In either case as the transformer primary is moved over the short secondary, a fixed arc of the motor stator is energised but the number of poles contained in that arc varies, thus producing the speed variation. If the full periphery of the motor stator is provided with bars, fractional numbers of poles may not be effectively generated on it when the rotor is running, since the rotor currents tend to distort the intended flux pattern. The result is that the machine shows a marked preference for the speeds corresponding with even pole numbers. However, if only a part of the periphery of the motor is provided with bars, the remaining part may either have the stator iron removed, so as substantially to eliminate the magnetic field over a part of the rotor surface, or alternatively the remaining part of the stator may be fitted with shorting rings so as to produce a similar effect. If this is done the machine is able to run well at speeds intermediate between the even pole number speeds because the rotor is unable to carry substantial amounts of flux from the end of the excited arc back to the beginning of the excited arc. The short-circuited arc necessary for this type of operation need not actually exist on the motor stator. In the short primary version, shorting rings 26 can alternatively be provided on the transformer primary and be coupled to the stator through the transformer, as indicated by the dotted lines in FIG. 11.

An alternative mechanical construction of the arrangement according to the invention is shown in FIG. 12. The centre member 60 is a squirrel cage rotor. The adjacent member 61 is annular with slots on the inner and outer cylindrical surfaces, the inner surface corresponding with the motor stator and the outer surface with the transformer secondary. These slots are inter-connected in a non-linear manner to provide the requisite logarithmic law. The outer member 62 carries the transformer primary winding logarithmically distributed to match the effects of the distribution on the transformer secondary and on the motor stator. Speed variation can be obtained either by rotating the outer member 62 relative to the annular member 61, or the annular member 61 relative to the outer member 61. In the latter case there are no external electrical connections of any kind to the part which is moved to adjust the speed and the forces on it are small. In the case where the annular member 61 is adjusted relative to the outer member 62, the latter could be mounted on a suitable base 63 while the annular member 61 would be mounted in an overhung bearing, the shaft 64 to which the rotor is secured also passing through this bearing and a further bearing at the other end of the machine.

The machine can of course be caused to run in either direction by appropriate connection of the phases, but the preferred direction is such that the primary field in the transformer section is travelling from the short pole pitch end towards the long pole pitch end. This is because when the machine is running light the flux piles up at this end of the structure and there is more iron per pole here to carry it.

Referring now to FIG. 13 in which the effect of a short-circuited section on the motor stator is obtained by means of a shorted section 26 on the transformer primary 30, it may be desired that at the top speed of the machine this shorted section should be eliminated and the machine designed to work effectually with an even number of poles. This result can be achieved as shown in FIG. 13, by arranging that there is, at the top speed setting, an unwound part 27 of the transformer secondary opposite the shorted section of the transformer primary. As speed is reduced from top speed by moving the transformer primary to the left, the short-circuited section of the primary will progressively move from the unwound part to the wound part of the secondary and so appear progressively on the motor stator so that it can be effective at speeds corresponding with fractional numbers of poles, or any whole number of poles greater than the top speed pole numbers.

A further application of the invention is to a pole-changing arrangement for varying the speed of an induction motor. It will be appreciated that in all the application so far described, the transformer primary has carried a single set of windings. However, a second set of windings with a different number of poles can be wound in the same slots as the first set of windings, providing, for example, two poles for each pole of the first set. Alternatively, however, referring to FIG. 5, in which some of the windings were omitted to provide latitude for movement, the windings could in fact be left complete, as in FIG. 4, with provision for different sections to be brought into play at different times. For example, the windings could be supplied at the left hand end and a star point formed at the 540° point in FIG. 4. This arrangement would then operate as described in relation to FIG. 5. Alternatively, the supply could be to the 180° point with the star point transferred to the right hand end of the windings in which case the primary of FIG. 5 can be moved until the 20th slot is opposite the 10th slot on the secondary, so providing a further 2:1 change of speed. This process of moving the supply point progressively to the right in FIG. 4 can be continued to the point where there are too few poles left to the right of the supply point for satisfactory operation. To avoid this difficulty the windings can be extended beyond the right hand end of FIG. 4 into the left hand end of FIG. 4 as a second set of windings, it being remembered that in the cylindrical form the right-hand end of FIG. 4 is coincident with the left-hand end. In this way the sets of windings can theoretically proceed round and round the structure, with a multiplicity of supply and star points provided to cover different speed ranges. The process will, of course, eventually become impossible in practice due to the rapidly decreasing pole pitch of the winding. A simple arrangement of this type is shown in FIG. 16 where an 8-pole primary winding is shown together with two switches SW1 and SW2. The three phase supply leads are connected to switch SW1 while a star point is connected to switch SW2. With the switches in the position shown in the drawing, the supply is to the 0° point and the star connection to the 900° point while when both switches are operated, the supply is to the 360° point and the star connection to the 1440° point.

In all the drawings the slots in the primary core have been shown as being parallel to those in the secondary core. However, in a practical machine it is probable that a slight skew will be introduced between the slots in the two cores. This skewing of the slots represents a compromise in order to obtain reasonable constancy of efficiency at all positions of the primary winding with respect to the secondary winding.

It will also be understood that while the description has been concerned with an induction machine which provides a mechanical drive when a polyphase supply is connected to it, the machine may equally well be employed as an induction generator. In this case, a polyphase supply will be connected to the primary winding of the transformer section to provide the magnetising current in the usual way and the rotor will be mechanically driven.

With regard to the use herein of the expression "logarithmic function," it is to be understood that, while for practical purposes one of the parameters will be directly proportional to the logarithm of another parameter, this need not be so theoretically. For instance, considering the form of the invention shown in FIG. 9 where the distance of a slot from a first slot is proportional to the logarithm of the slot number, there is no theoretical reason why the distance of the slot from a first slot should not be proportional, for example, to the logarithm of the square of the slot number. It will, of course, be understood that it is essential that the function should be the same for both primary and secondary windings. It is the similarity between the primary and secondary windings which enables a regular change in the phase increment between the secondary outputs to be obtained, the interconnectors between the outputs and the regularly spaced bars of the third winding (motor stator) effectively producing the antilogarithm of the phase distribution of the primary winding.

I claim:

1. An induction machine comprising a polyphase transformer arrangement energised from a polyphase supply, a plurality of outputs for said transformer arrangement, means for varying the phase difference of the currents flowing in adjacent outputs, a first slotted core structure, a first winding consisting of a plurality of bars arranged in the slots of said first slotted core structure, a second structure consisting of a squirrel cage winding electromagnetically coupled to said first winding, electrical connections between said plurality of outputs and said plurality of bars whereby said first slotted core structure generates a moving magnetic field which causes movement of said second structure and means for varying the phase difference between adjacent ones of said outputs to enable the speed of movement of said moving magnetic field and hence the speed of movement of said second structure to be varied.

2. An induction machine comprising a first slotted core structure, a primary winding accommodated in the slots in said first slotted core structure and energised from a polyphase supply, said primary winding being arranged in such a manner that the phase of the effective current flowing in the conductors of any slot is a logarithmic function of the distance of that slot from a first slot, a second slotted core structure, a secondary winding logarithmically distributed on said second slotted core structure and electromagnetically coupled to said first winding, a third slotted core structure, a third winding accommodated on said third slotted core structure, electrical connections between said secondary winding and said third winding such that the phase of the effective current flowing in the conductors of any slot of said third core structure is proportional to the distance of that slot from a first slot, a moveable member consisting of a fourth slotted structure having bars of conducting material arranged in the slots thereof and short-circuited at both ends, said movable member being electromagnetically coupled to said third winding whereby said movable member moves due to the moving magnetic field set up by current flow in said third winding and means for adjusting the relative position between said primary and secondary windings to effect variation of the constant of proportionality between the phase of the effective current flowing in the conductors of any slot of said third core structure and the distance of that slot from a first slot whereby the speed of movement of said movable member is capable of adjustment in accordance with said variation.

3. An induction machine as claimed in claim 2 wherein the slots in said third core structure are equally spaced.

4. An induction machine as claimed in claim 2 wherein the spacing between the slots of said first core structure varies as a logarithmic function of the slot number and the slots in said second and third core structure also vary logarithmically in opposite senses.

5. An induction machine as claimed in claim 2 wherein said secondary winding and said third winding consist of bars arranged in the slots of said second and third core structures.

6. An induction machine as claimed in claim 5 wherein electrical connections are provided between bars in certain only of the slots of said second core structure and bars in certain only of the slots of said third core structure.

7. An induction machine as claimed in claim 2 wherein said secondary winding and said third winding consist of ring-wound coils arranged in the slots of said second and third core structures.

8. An induction machine as claimed in claim 7 wherein electrical connections are provided between coils in certain only of the slots of said second core structure and coils in certain only of the slots of said third core structure.

9. An induction machine as claimed in claim 2 and comprising means for fixedly mounting second and third cylindrical slotted core structures for accommodating said secondary and third windings respectively with their cylindrical axes in alignment, first and fourth cylindrical slotted core structures for accommodating said primary winding and said bars respectively, means for mounting said first cylindrical slotted structure for rotation with respect to said second cylindrical slotted structure and means for mounting said fourth cylindrical slotted structure for rotation with respect to said third cylindrical slotted structure.

10. An induction machine as claimed in claim 2 and comprising means for fixedly mounting a first cylindrical slotted structure for accommodating said primary winding, a second cylindrical structure having slots on the outer and inner surfaces thereof for accommodating said secondary and third windings respectively and rotatably mounted within said first cylindrical slotted structure and a third cylindrical slotted structure for accommodating said bars and rotatably mounted within said second cylindrical structure.

11. An induction machine as claimed in claim 2 wherein said first structure is provided with a first and a second winding arranged in the same slots, and generating different numbers of poles and means are provided for energising said first and said second winding.

12. An induction machine as claimed in claim 2 wherein said primary winding comprises a plurality of sections and means are provided for connecting the polyphase supply to different points on the primary winding to render said sections effectively successively.

13. An induction machine as claimed in claim 2 wherein a plurality of primary windings are wound in the same slots and generate different numbers of poles, means being provided for rendering the windings effective successively.

No references cited.